(12) United States Patent
Ballard et al.

(10) Patent No.: US 8,256,715 B2
(45) Date of Patent: Sep. 4, 2012

(54) DEVICES, SYSTEMS AND METHODS FOR MODULAR PAYLOAD INTEGRATION FOR UNMANNED AERIAL VEHICLES

(75) Inventors: Brian Adams Ballard, Herndon, VA (US); Robert Daniel Kluesener, Arlington, VA (US); Zenovy Stephan Wowczuk, Alexandria, VA (US); Alexander Cobb Watson, Severn, MD (US)

(73) Assignee: MAVG, LLC, Vicksburg, MI (US)

( * ) Notice: Subject to any disclaimer, the term of this patent is extended or adjusted under 35 U.S.C. 154(b) by 465 days.

(21) Appl. No.: 12/621,257

(22) Filed: Nov. 18, 2009

(65) Prior Publication Data

US 2010/0123042 A1    May 20, 2010

Related U.S. Application Data

(60) Provisional application No. 61/116,289, filed on Nov. 19, 2008, provisional application No. 61/115,933, filed on Nov. 18, 2008.

(51) Int. Cl.
*B64C 1/00* (2006.01)

(52) U.S. Cl. ............................ 244/123.1; 244/123.5

(58) Field of Classification Search ............ 244/123.1, 244/123.5, 124, 137.4, 36, 45 R, 139, 140
See application file for complete search history.

(56) References Cited

U.S. PATENT DOCUMENTS

| | | | | |
|---|---|---|---|---|
| 2,557,962 A * | 6/1951 | Greene | ................. | 244/118.2 |
| 2,693,922 A * | 11/1954 | Ellison et al. | ............. | 244/123.5 |
| 3,873,654 A * | 3/1975 | Smith | ..................... | 264/258 |
| 6,164,595 A * | 12/2000 | Williams | .................. | 244/139 |
| 7,237,750 B2 * | 7/2007 | Chiu et al. | ................. | 244/119 |
| 7,699,261 B2 * | 4/2010 | Colten et al. | ............... | 244/45 R |
| 7,922,115 B2 * | 4/2011 | Colgren et al. | .............. | 244/13 |
| 2003/0192986 A1 * | 10/2003 | Page et al. | .................. | 244/36 |

* cited by examiner

*Primary Examiner* — Tien Dinh
*Assistant Examiner* — Keith L Dixon
(74) *Attorney, Agent, or Firm* — Moazzam & Associates, LLC

(57) ABSTRACT

Devices, systems and methods are disclosed which relate to providing wing designs with payload integration capabilities on existing modularly assembled unmanned aerial vehicles (UAVs). Exemplary embodiments of the present invention present a novel technique of adding payloads to existing UAVs while improving flight performance over existing techniques by maintaining a similar overall weight with improved aerodynamic properties. The technique includes using a reinforced foam core center wing with a fiberglass epoxy skin. A lightweight payload canopy cover integrates onto the center wing as an agnostic enclosure for payloads. The payload canopy cover may contain venting holes for the cooling of electronic payloads. The systems may also include common devices such as antennas, GPS, and batteries for use with a wide range of payloads.

18 Claims, 18 Drawing Sheets

DEVICES, SYSTEMS AND METHODS FOR MODULAR PAYLOAD INTEGRATION FOR UNMANNED AERIAL VEHICLES

This application claims priority to U.S. Provisional Patent Application Ser. No. 61/115,933, filed Nov. 18, 2008, and to U.S. Provisional Patent Application Ser. No. 61/116,289, filed Nov. 19, 2008, the contents of both of which are hereby incorporated by reference in their entirety into this disclosure.

BACKGROUND OF THE INVENTION

1. Field of the Invention

The present invention relates to expanding mission capabilities and payload architecture for UAV system wing designs though the means of an open-architecture payload bay. More specifically, the present invention relates to wing designs with integrated aerodynamic payload integration systems for unmanned aerial vehicles (UAVs).

2. Background of the Invention

Unmanned aerial vehicles (UAVs) are unpiloted aircraft which may be controlled remotely or based upon a pre-programmed flight plan. UAVs have become an increasingly important tool for law enforcement, military, and security personnel to travel and gather information from otherwise hostile territory. Types of UAVs are used for reconnaissance as well as attack missions. Though conventional UAVs have been highly successful in gathering video or footage of the terrain and personnel within hostile territory, the gathering of other types of data has been a more difficult undertaking. Part of the reason for such difficulty is that UAVs are generally very light, some on the order of 5-10 pounds, and the installation of heavy equipment or other bulky payloads completely distorts the flying and maneuvering abilities of such aerial vehicles.

This disclosure concentrates on small, hand-deployed UAV systems that are assembled in "kit" form with the wing sections being their own sub-components or made of multiple sub-components. One type of small UAV, the RQ-11 RAVEN, is a modularly assembled remote controlled tactical UAV used by the military. The RAVEN is approximately 5 pounds with a battery, approximately 4.5 pounds without. The RAVEN came into common service in the military community, mainly the army, navy, and marines, as a small tactical UAV. The RAVEN has a basic capability of being able to fly for roughly an hour under the control of a local user. Alternatively, the RAVEN may fly completely autonomous missions using GPS waypoint navigation. The sensor capabilities of the RAVEN include electrical-optical or infrared (EO/IR) full motion video cameras. Infrared capability allows for night flying of the RAVEN.

Currently, most small UAVs are produced with optical surveillance capability and have little to no add-on or enhancement features to increase the base mission capability. They are typically designed to be man packable, reusable, and have a very small supply footprint, such that a unit can hand launch it, fly it around, scout ahead, and then bring it back.

More recently, the intelligence community has begun to see small UAVs as a convenient platform to try and deploy small sensors and serve as test bed for small enhancement features. A current example of how the military currently accomplishes this is through crude attachment means (i.e., duct taping payloads to the top of the wing). An alternative was actually carving into the wing itself with a DREMEL tool then gluing components into the wing. Either way requires a very manual process, and the end result is not rugged. Furthermore, an inordinate amount of man hours are spent guessing as items are placed wherever they can fit on the center wing section with no protection against failures, center of gravity effects, or drag. Not surprisingly, these types of payload attachments have caused many problems. For example, with the duct-taped payload, the RAVEN only reliably flies about 45 minutes or around three-quarters of its normal flight time due to degraded aerodynamics (increased drag), and increased weight. This may be even shorter, depending on how heavy the attached payload is. Thus, there have been different configurations attempted, but each has resulted in a significant drop in the flight time.

From a weight perspective, a payload affects the flight systems themselves. Some of the lost flight time comes from a heavier payload forcing the motor to work harder to get the RAVEN up to altitude and constantly re-climbing, because every plane has a glide ratio. Also, because the center of balance of the RAVEN changes along with the drag, the RAVEN with the payload could porpoise, affecting the ability to keep a camera focal point on target.

Furthermore, the takeoff of the RAVEN is significantly affected. While testing did not produce stall outs, many of the takeoffs do not perform in a normally observed manner, presumably all due to the weight increase. This is a significant problem in some of the overseas areas in which the RAVEN is used because of high temperatures. In these high temperatures, the air is less dense, and the airfoil generates less lift. The additional drag and extra weight of the payload on the RAVEN without having some kind of lift characteristics due to the packaging causes improper or failed takeoffs. In the worst cases, the platform never makes it off the ground. Users are forced to try to find spots with an elevation, for instance, by climbing up a tower to launch it from, just to guarantee that the RAVEN gets enough speed that it can generate the lift it needs to take off. This is far different than the normal takeoff by throwing the RAVEN from the ground.

A battery, camera systems, and communications downlinks are all packed into the body of a UAV such as the RAVEN. The wing of a UAV, however, is composed of an ultra-light weight foam material. Though few components are small enough to be completely embedded in the wing, a slight redesign to make a cavity within the wing is not as costly in terms of efficacy as long as the wing remains aerodynamic.

Thus, what is needed in the art is a system and method to carry payloads or other equipment on UAVs already in use. Such systems and methods should be easy to understand and implement, and adaptable to existing UAVs such that very little re-design of the conventional UAV is needed. An integrated payload attachment including elements necessary for the electromechanical functioning of the payload is ideal.

SUMMARY OF THE INVENTION

The present invention provides for systems and methods of providing wing design and flexible payload integration capabilities on existing modularly assembled UAVs. Exemplary embodiments of the present invention present a novel technique of adding payloads to existing UAVs to improve flight performance over existing techniques by maintaining a similar overall weight with improved aerodynamic properties. The technique specifically looks at replacing an existing wing sub-section with an open-architecture payload bay capable of multi-payload system integration.

The technique includes using a reinforced foam core center wing with a fiberglass epoxy skin that includes open "bay" areas to allow system users to store payloads. A thin carbon fiber (or other lightweight material) payload canopy cover integrates onto the center wing as an agnostic enclosure for payloads. The payload canopy cover may contain venting holes for the cooling of electronic payloads in high temperature environments. The technique also provides common connections to items such as power, antennas, and GPS which are also embedded in the foam wing core. Given the current technique, explosive payloads may be utilized as well for an offensive UAV.

According to an exemplary embodiment of the invention, a foam core wing with a fiberglass epoxy skin serves as a basis for the design in order to adequately mate with the existing airframe. The wing dimensions may be increased in order to provide an increased lift to make up for anticipated payload weight. In order to maintain the structural strength of the wing, the design must reinforce the lateral dimension of the wing. Given the addition of payload bays, this can be done through folds in the fiber based skin material or through structural cross-bracing. Embodiments of the invention include an embedded copper sheet ground plane mounted to the "downlink" antenna in order to optimize the ground plane to the antenna frequency. Additionally, antennas may be embedded into the wing for use with specific payloads. A carbon fiber, fiberglass composite, or lightweight plastic is used for the payload canopy. These, or other materials, are used to provide a strong and lightweight canopy.

In one exemplary embodiment, the present invention is a device for use on a UAV. The device includes a wing having an open cavity and a wing airfoil, and a cover removably coupled to the open cavity having an aerodynamic shape such that the combination of the cover and the wing yields a payload airfoil of greater thickness than the wing airfoil. A payload bay is created from the combination of the volume of the open cavity in the wing and from the volume added by the cover.

In another exemplary embodiment, the present invention is a payload cavity for use on a UAV. The device includes a wing having an open cavity centered along the UAV's line of symmetry and a wing airfoil, and a rigid cover providing an open volume removably coupled to the open cavity such that the open volume and the open cavity are united. The union of the open volume and the open cavity creates a payload volume and a payload airfoil.

In a further exemplary embodiment, the present invention is a method for adding a payload system to a UAV. The method includes creating a rigid shell to complement an airfoil of a wing while increasing a thickness of the airfoil, attaching the rigid shell to a center wing of the UAV wherein a payload cavity is created bound by the wing and the rigid shell, and attaching the center wing to the UAV. The rigid shell is aerodynamically shaped to minimize efficiency loss.

DETAILED DESCRIPTION OF THE INVENTION

The present invention provides systems and methods of providing wing design and flexible payload integration capabilities on existing modularly assembled UAVs. In exemplary embodiments of the present invention a payload cavity is built into a wing of a UAV. The payload cavity comprises a smaller cavity carved out of the wing joined by an optionally larger cavity created by a rigid cover or shell that is coupled with the wing. The rigid cover is shaped such that the union of the cover and wing forms a new airfoil with an increased payload cavity thickness while maintaining aerodynamic quality. The payload cavity can be used to store small electronics such as single-board computers, GPS receivers, extra batteries for longer UAV flights, explosives for offensive UAVs, and other payloads that fit within the cavity footprint and electrical power capabilities. The rigid cover is easily removed to expose the payload cavity so its contents can be removed, replaced, etc.

"Airfoil," as used herein and throughout this disclosure, refers to the shape of the cross-sectional area of a wing of an aerial vehicle. An airfoil design includes a leading edge, a thickness, and a trailing edge. Further details concerning individual airfoil designs throughout this disclosure are given for each embodiment.

"Canopy," as used herein and throughout this disclosure, refers to a rigid cover for a UAV payload cavity. A canopy can be shaped like a hemisphere, open box, or any other hollow shape. Exemplary embodiments of a canopy throughout this disclosure are aerodynamically shaped.

According to an exemplary embodiment of the invention, a foam core wing with a fiberglass epoxy skin serves as a basis for the design in order to adequately mate with the existing airframe. A rigid cover is added to the wing which increases the airfoil dimensions in order to provide an increased lift to make up for the payload. In order to maintain the structural strength of the wing, balsa spars are embedded that extend through the ¼ cord section of the wing. These spars are reinforced with carbon fiber or aromatic polyamide for added strength. Ideally, these spars are water-jet cut when made in sheets, as lasers burn the balsa, reducing effectiveness. These spars form the internal structure of the wing. Embodiments of the invention include an embedded copper sheet ground plane mounted to the "downlink" antenna in order to optimize the ground plane to the antenna frequency. Additionally, blade antennas may be embedded into the wing for use with specific payloads. A carbon fiber or a carbon fiber-fiberglass composite is used for the payload canopy. These, or other materials, are used to provide a strong and lightweight canopy. The manufacturing process of the wing reduces the amount of hand labor and resin required to produce an ideal airfoil surface.

Figure 1A:
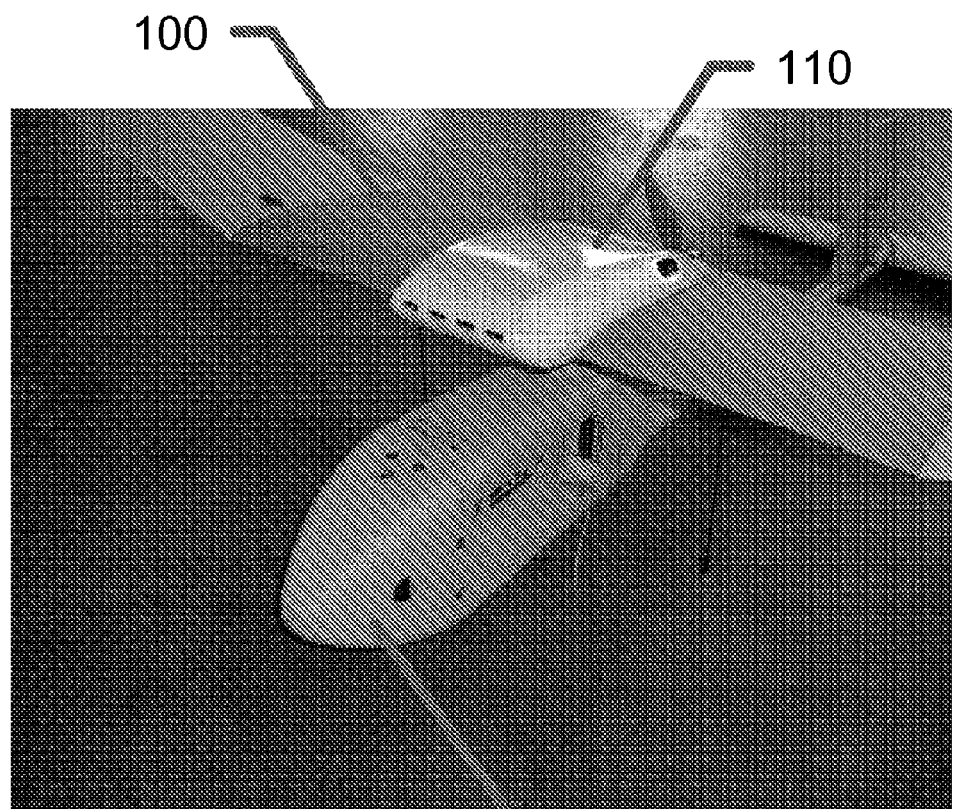
FIGS. 1A and 1B show an unmanned aerial vehicle (UAV) having a center wing with a payload cavity covered by a canopy, according to an exemplary embodiment of the present invention.
Figure 1B:
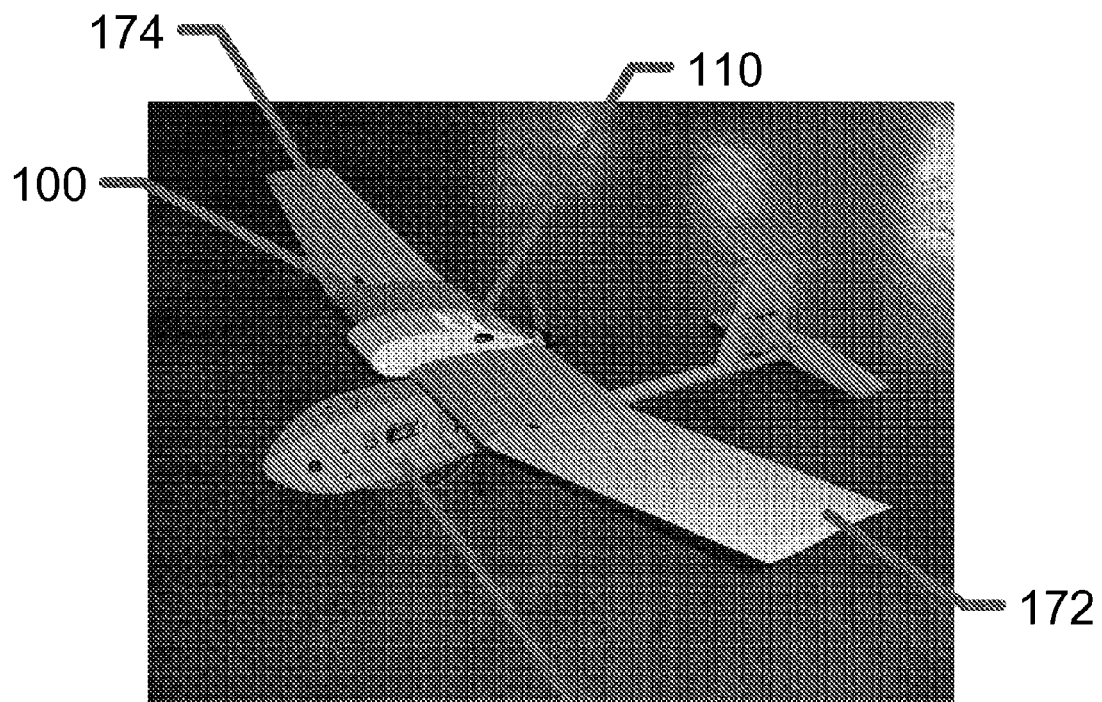

FIGS. 1A and 1B show an unmanned aerial vehicle (UAV) 170 having a center wing 100 with a payload cavity covered by a canopy 110, according to an exemplary embodiment of the present invention. Unmanned aerial vehicle 170 includes center wing 100, two dihedral wings 172 and 174, and canopy 110. In this embodiment, UAV 170 is a RQ-11 RAVEN. Dihedral wings 172 and 174 are removably coupled to the ends of center wing 100. Center wing 100 is removably coupled to unmanned aerial vehicle 170 at the fuselage, or body, of unmanned aerial vehicle 170. This coupling may be accomplished by a screw, rivet, clip, or other fastener. As center wing 100 is removably coupled to unmanned aerial vehicle 170, center wing 100 can easily be interchanged such that a different center wing with a different payload may be easily attached. For instance, a typical RAVEN center wing can be attached in roughly twenty seconds. Canopy 110 is removably coupled to the top of center wing 100. Canopy 110 secures a payload being carried by UAV 170. The payload may include a control board which is positioned in the bay and canopy of center wing 100. This allows the control board to be positioned in the most imbedded location within the airfoil profile. Canopy 110 includes vents on the front and sides to allow airflow to the payload which keep the payload from overheating, allow the payload to test the air, etc.

The wing of a RAVEN has three sections, two dihedral elements out on the edges that are aimed up at about eighteen degrees and then a center wing. The center wing is where the wing attaches to the body of the UAV during flight, but it is a detachable wing. According to embodiments of the present invention, the center wing is constructed to integrate a wide range of desired payloads. To create the center wing, the basic aerodynamic profile and mounting points of a stock wing are used. The center wing is extended two inches on either end in order to increase the lift surface.

Figure 2A:
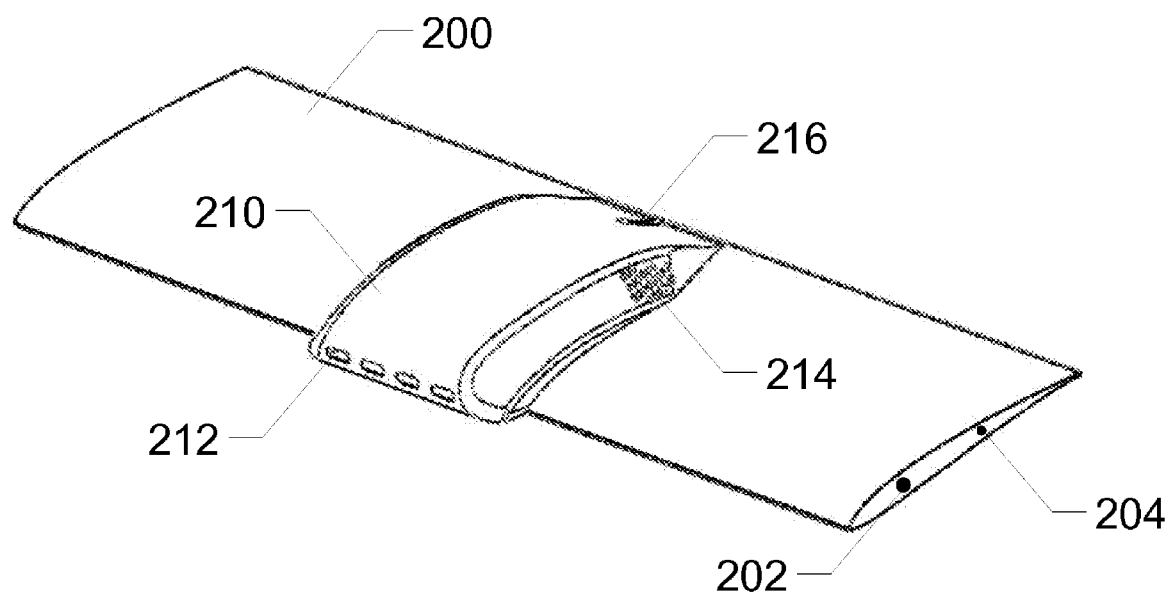
FIG. 2A shows a perspective view of a center wing for an unmanned aerial vehicle, according to an exemplary embodiment of the present invention.

FIG. 2A shows a perspective view of a center wing 200 for an unmanned aerial vehicle, according to an exemplary embodiment of the present invention. This view of center wing 200 shows a blind hole 202, a shallow blind slot 204, a canopy 210, an air intake 212, an exhaust 214, and a disengagement slot 216. Blind hole 202 and shallow blind slot 204 allow for the attachment of the dihedral wings to either end of center wing 200. The ends of center wing 200 are planar surfaces nine degrees from normal. Blind hole 202 allows for the inserting of a mounting peg of the dihedral wing. Inside of blind hole 202 is a carbon fiber or plastic cylinder to provide a reinforced mounting point. Shallow blind slot 204 receives a peg from the dihedral wing and prevents the dihedral wing from rotating about the peg in blind hole 202. Canopy 210 couples to center wing 200 and is engaged and disengaged using a screw through a countersink thru hole. Air intake 212 allows for a limited airflow into the payload area. This may, for instance, cool a circuit board contained in the payload. Exhaust 214 allows air to exit the payload area. Slot 216 allows for center wing 200 to disengage from the fuselage during a hard landing. The countersink thru hole decouples canopy 210 from center wing 200 by removing a clip, screw, or other fastener, allowing a user to check or make changes to the payload.

Figure 2B:
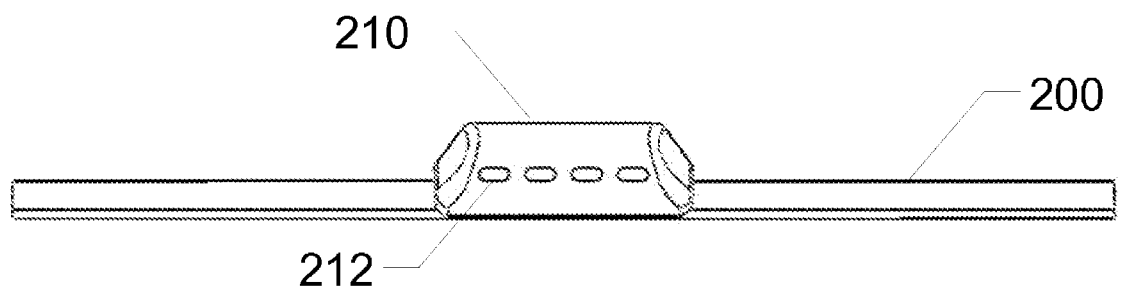
FIG. 2B shows a front view of a center wing for an unmanned aerial vehicle, according to an exemplary embodiment of the present invention.

FIG. 2B shows a front view of a center wing 200 for an unmanned aerial vehicle, according to an exemplary embodiment of the present invention. This view of center wing 200 shows a canopy 210 and an optional air intake 212. Canopy 210 has a profile such that it remains aerodynamic and allows as much for uninterrupted airflow to the propeller of the UAV as possible while still providing room for the payload. Air intake 212 allows air to flow into canopy 210 to keep the payload from overheating, provide the payload with air for testing, etc. In this embodiment, air intake 212 includes four oval-shaped holes on the leading edge of canopy 210. Other suitable location, shapes, and sizes of air intake 212 are possible based on the shape and design of canopy 210.

Figure 2C:
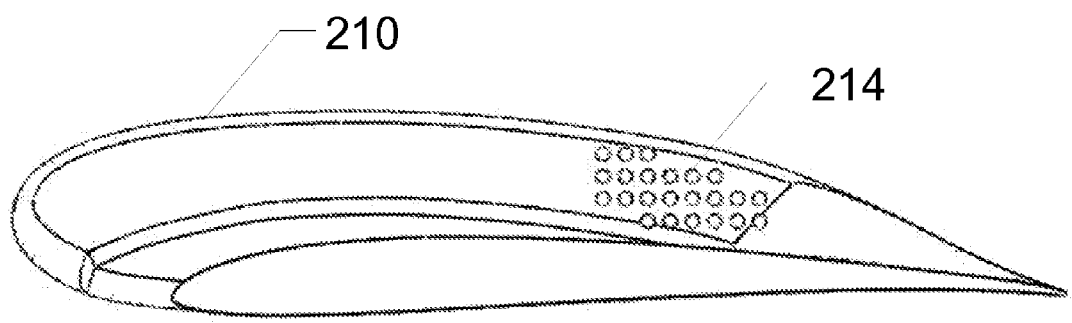
FIG. 2C shows a side view of a canopy for a center wing of an unmanned aerial vehicle, according to an exemplary embodiment of the present invention.

FIG. 2C shows a side view of a canopy 210 for a center wing of an unmanned aerial vehicle, according to an exemplary embodiment of the present invention. This view of canopy 210 shows an optional exhaust 214, which allows air to exit the inside of canopy 210. In this embodiment, exhaust 214 includes a plurality of circular holes on either side of canopy 210 close to the trailing edge of canopy 210. Other suitable locations, shapes, and sizes of exhaust 214 are possible based on the shape and design of canopy 210.

Figure 2D:
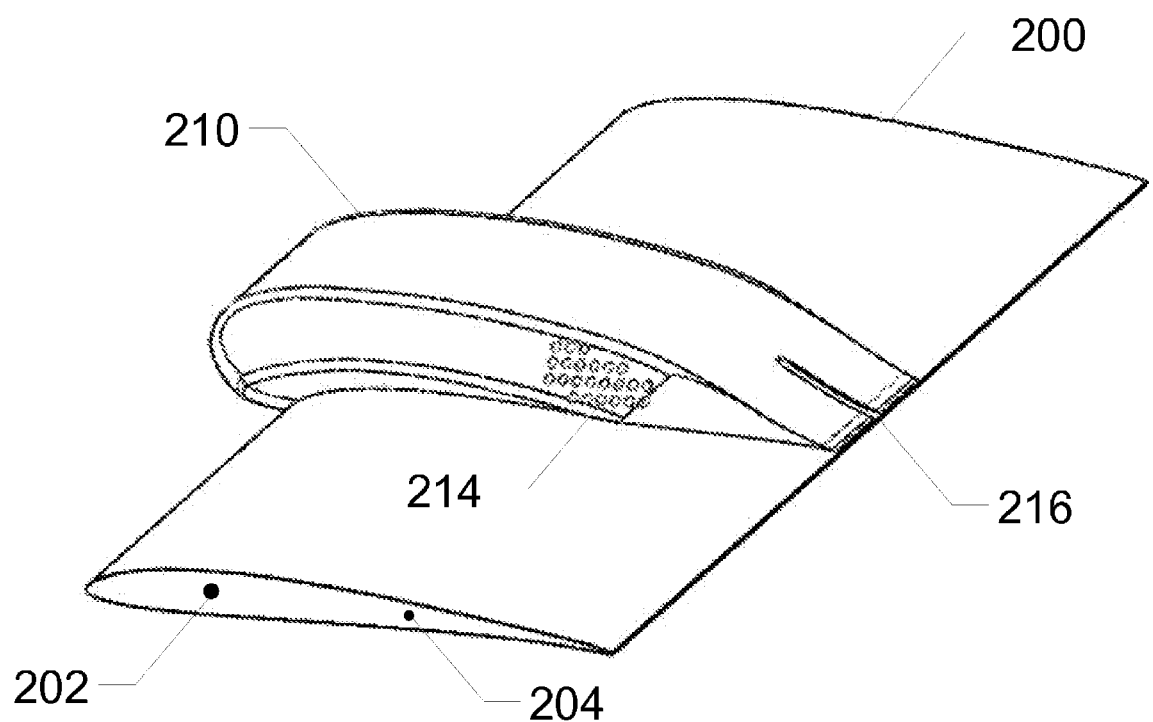
FIG. 2D shows a rear perspective view of a center wing for an unmanned aerial vehicle, according to an exemplary embodiment of the present invention.

FIG. 2D shows a rear perspective view of a center wing 200 for an unmanned aerial vehicle, according to an exemplary embodiment of the present invention. This view of center wing 200 shows a blind hole 202, a shallow blind slot 204, a canopy 210, an exhaust 214, and a mounting slot 216. Mounting slot 216 is a substantially rectangular slot along the length of canopy 210 beginning near the trailing edge and ending at the trailing edge. Mounting slot 216 has a rounded radius on the end farthest from the trailing edge. Mounting slot 216 allows center wing 200 to disengage from the fuselage of the UAV during a hard landing. Exhaust 214 includes a plurality of circular holes on either side of canopy 210. Blind hole 202 and shallow blind slot 204 are utilized for the attachment of dihedral wings to center wing 200.

In other exemplary embodiments of the present invention, the canopy does not have holes for intake and exhaust. These embodiments are used for payloads that do not require cooling or require a higher operating temperature. Other embodiments of the canopy contain holes for intake and exhaust, but can be easily covered to convert the canopy.

When constructing a wing, a foam type is selected for the core of the wing based upon the required properties of the wing. For example, one pound white foam manufactured by INSULATION CORPORATION, INC. may be used. This type of foam is lightweight and a fiberglass cloth may be used to surround and strengthen it. However, the white foam requires a balsa wood veneer under the fiberglass cloth to provide added strength. Thus, this type of foam is best suited for low load applications. Alternatively, 2.2 pound blue foam, such as DOW STYROFOAM HIGHLOAD 60, or extruded polystyrene, may be used. This foam is a stronger foam more appropriate for higher loads. The 2.2 pound blue foam is better than the white foam for tough environmental conditions and does not require a balsa wood veneer. However, the 2.2 pound foam is heavier than the white foam and also typically requires a thicker fiberglass compared to the white foam. A 2.42 pound SPYDERFOAM manufactured by AEROSPACE COMPOSITE PRODUCTS is also a possibility. This type of foam is the strongest of the three, with two times the compression strength of the blue foam and greater shear strength. The SPYDERFOAM also allows for better penetration of epoxy resin and does not require a balsa wood veneer. However, the SPYDERFOAM is roughly 20% heavier than the blue foam and requires a thicker fiberglass cloth compared to the white foam. Other types of foam may also be used based upon the properties desired and are apparent to one of ordinary skill in the art. Recent advances in the manufacturing process have found certain types of expanding foam are ideal for mass production and provide adequate strength. With a type of foam selected based on the requirements, the wing and payload system are constructed.

FIGS. 3-11 show the manufacture of a wing and payload system, according to an exemplary embodiment of the present invention. In this embodiment, a selected foam is cut and attached to an internal frame for the wing. Electronics, such as antennas, may be spaced on the wing, with wiring running into the payload area. A coating is added to the wings for strength and rigidity.

Figure 3:
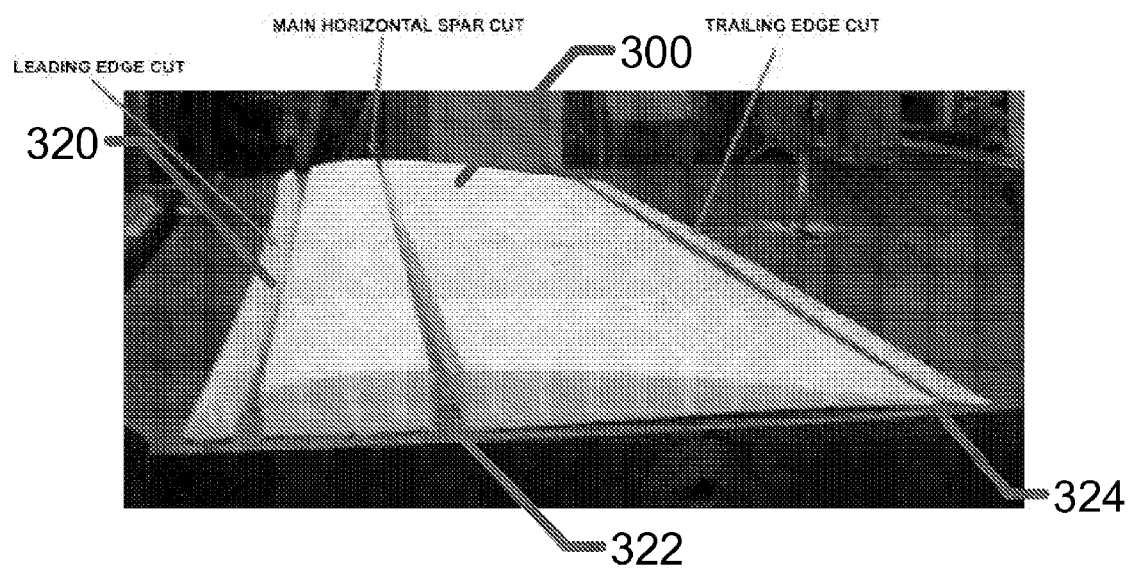
FIG. 3 shows a foam core for a center wing cut into four pieces, according to an exemplary embodiment of the present invention.

FIG. 3 shows a foam core for a center wing 300 cut into four pieces, according to an exemplary embodiment of the present invention. The foam core has a leading edge cut 320, a main horizontal spar cut 322, and a trailing edge cut 324. The foam core is cut such that the pieces may be attached to an internal structure of a center wing. Each cut is made using a precision hot wire foam cutter. Leading edge cut 320 is a cut along the span of center wing 300, parallel to the leading edge of center wing 300. Trailing edge cut 324 is a cut along the span of center wing 300, parallel to the trailing edge of center wing 300. Main horizontal spar cut 322 is a cut along the span of center wing 300 between and parallel to leading edge cut 320 and trailing edge cut 324. When fully assembled, this is where the spar is located to provide rigidity to center wing 300.

Figure 4:
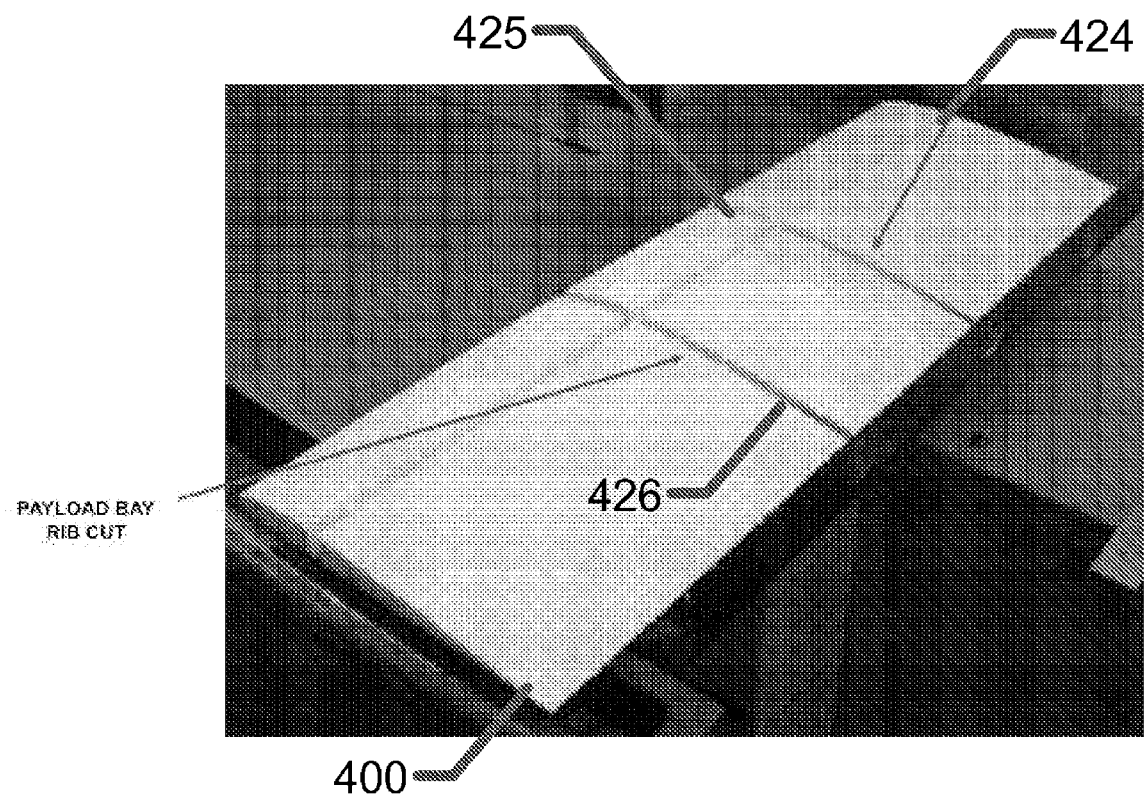
FIG. 4 shows a foam core for a center wing with payload cavity rib cuts, according to an exemplary embodiment of the present invention.

FIG. 4 shows a foam core for a center wing 400 with payload cavity rib cuts, according to an exemplary embodiment of the present invention. The foam core has a horizontal spar cut 425 and two payload cavity rib cuts 424 and 426. Payload cavity rib cuts 424 and 426 are at points about which the payload cavity is located. These foam parts are to be attached to an internal structure of the center wing.

Alternate exemplary embodiments contain vastly different cuts for insertion of many different internal structures. These cuts and the internal structure complementing them form the open cavity in the center wing. In the forgoing embodiments the payload cavity is rectangular while other embodiments explore different sizes and shapes of payload cavities.

Figures 5A, 5B:
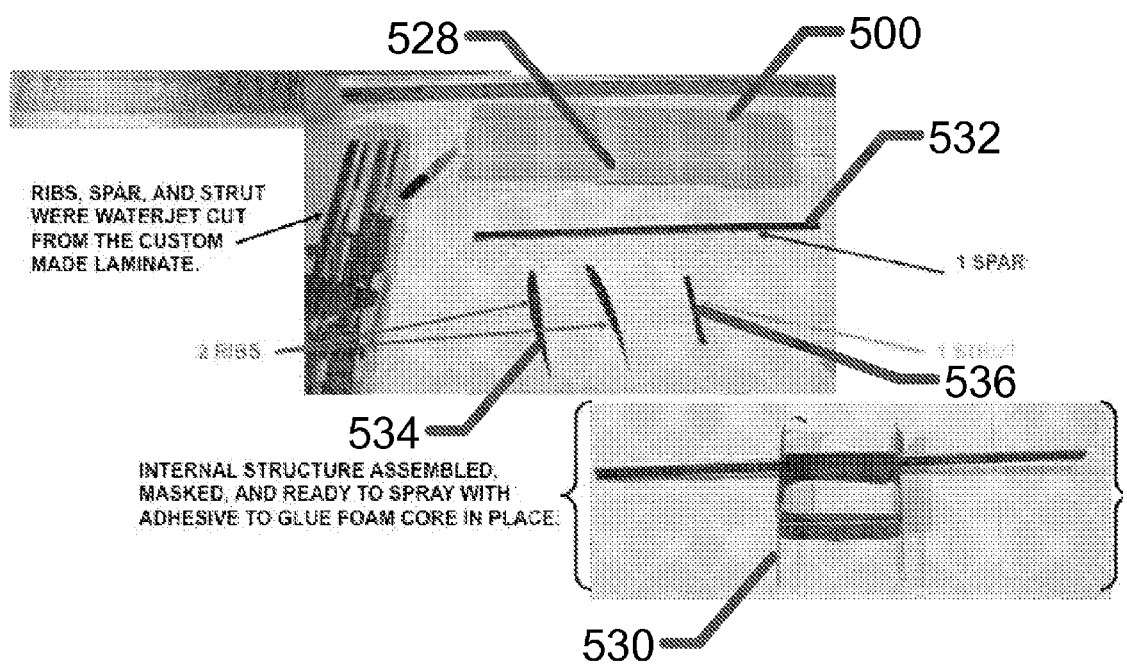
FIG. 5A shows an exploded view of an internal structure for a center wing for an unmanned aerial vehicle, according to an exemplary embodiment of the present invention.
FIG. 5B shows an assembled internal structure for a center wing for an unmanned aerial vehicle, according to an exemplary embodiment of the present invention.

FIG. 5A shows an exploded view of an internal structure for a center wing for an unmanned aerial vehicle, according to an exemplary embodiment of the present invention. The internal structure includes a spar 532, two ribs 534, and a strut 536. According to this embodiment, spar 532, ribs 534, and strut 536 are created by water-jet cutting from a custom laminate. The custom laminate is made of a sheet of balsa wood sandwiched between and epoxied to two layers of another material before being vacuum bagged and laminated. In exemplary embodiments, this material is 2.4 oz fiberglass. In another embodiment, the material is a carbon fiber/aromatic polyamide cloth. The vacuum bagging and laminating is done using a breather cloth to minimize excess epoxy.

Like the alternate embodiments of the foam wing cuts, alternate embodiments of the internal structure explore vastly different configurations in order to create payload cavities of different shapes and sizes. The internal structure, however, must match the foam cuts. For every cut in the foam wing, there should be a structure to fill it.

FIG. 5B shows an assembled internal structure 530 for a center wing for an unmanned aerial vehicle, according to an exemplary embodiment of the present invention. The internal structure includes spar 532, ribs 534, and strut 536. The internal structure is assembled, masked around the payload area, and sprayed with adhesive to fix the foam core in place. When assembled, ribs 534 extend across and perpendicular to spar 532. Strut 536 extends between ribs 534, parallel to spar 532. Spar 532 is an elongate member which extends the span of the center wing. Ribs 534 are to extend from the leading edge to the trailing edge of the center wing. Strut 536 connects the ribs, adding strength to the structure and distinguishing the payload area.

Figure 6:
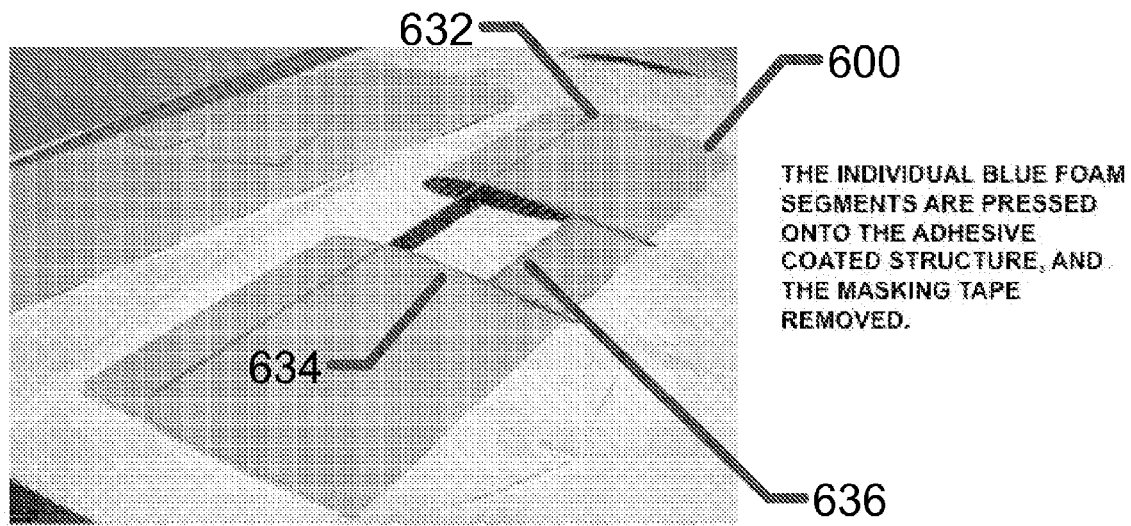
FIG. 6 shows a foam core held by an internal structure, forming a center wing for an unmanned aerial vehicle, according to an exemplary embodiment of the present invention.

FIG. 6 shows a foam core held by an internal structure, forming a center wing 600 for an unmanned aerial vehicle, according to an exemplary embodiment of the present invention. The pieces of foam core are fit into the internal structure, which includes a spar 632, two ribs 634, and a strut 636. The foam core is attached to the internal structure using an adhesive. In this embodiment, individual blue foam segments are pressed onto the adhesive coated structure of FIG. 6, and the masking tape removed. The area of the payload bay remains open with no foam pieces.

According to exemplary embodiments of the present invention, the center wing houses integrated electronics. For example, antennas may be embedded in the wing to provide for communication with a payload to an operator on the ground. Antenna wires are run along the length of the wing for patch antennas embedded in the wing. Additionally, the wing may include mount points for downlink omni-directional antennas. These electronics may be permanently attached, such as with epoxy, or removable. 2.4 GHz blade antennas, 900 MHz downlink omni-directional antennas, or any other type of relatively lightweight antennas may be used. The electronics of the center wing ideally are independent of the electronics of the UAV. This allows the UAV to retain all normal functions while adding new features in the form of payloads and antennas. While attempts have previously been made to incorporate payloads into the nose cone of a UAV, such a method requires interfering with the current functionality of the UAV, particularly by requiring the camera be removed. The present invention, for example allows a RAVEN to fly a direction finding payload that can locate target RF communications by using the payload and then focus the camera in the body of the RAVEN on that spot to see if anyone is actually there.

Figure 7:
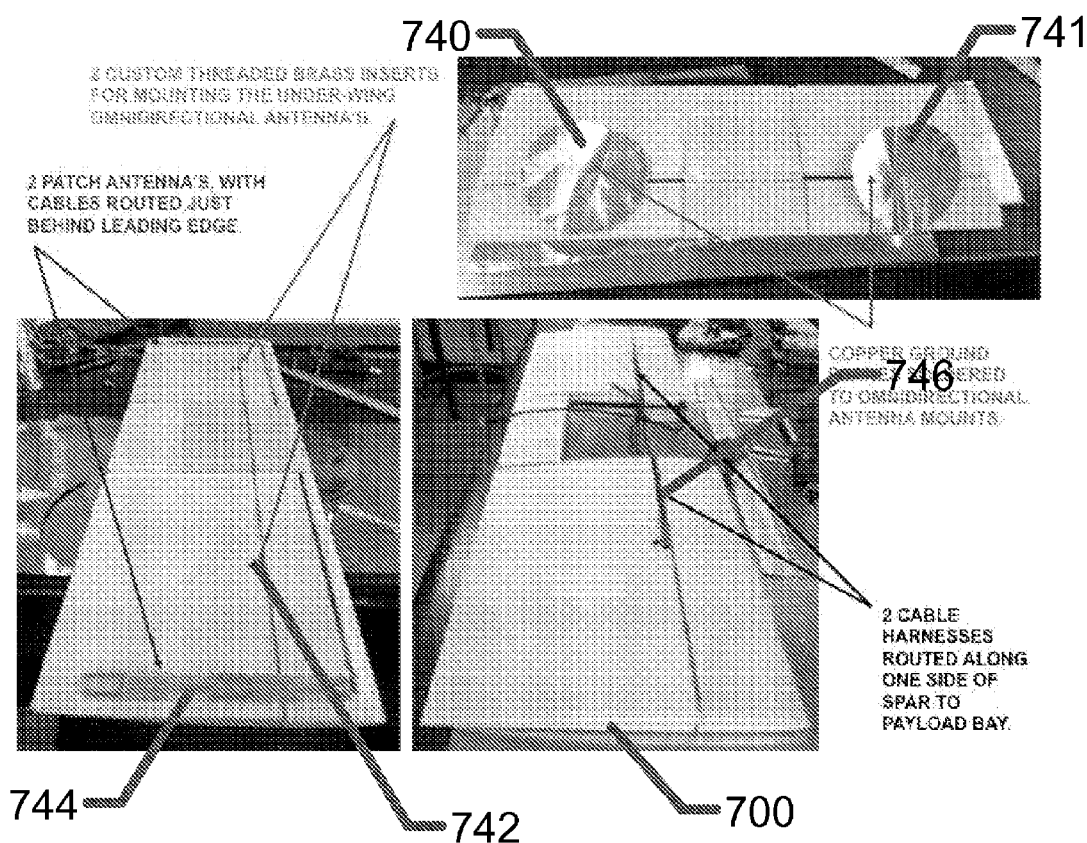
FIG. 7 shows a center wing having electronics mounted on it, according to an exemplary embodiment of the present invention.

FIG. 7 shows a center wing 700 having electronics mounted on it, according to an exemplary embodiment of the present invention. Center wing is constructed to utilize a 900 MHz downlink omni-directional antenna. The center wing 700's electronics include two copper ground planes 740 and 741, threaded brass inserts 742, patch antennas 744, and cable harnesses 746. In this embodiment, the antenna mount points with threaded brass inserts 742 are spaced along the underside of center wing 700 such that they do not interfere with the fuselage of the UAV when attached to the UAV. Threaded brass insert 742 is embedded in center wing 700 at each of the mount points. Threaded brass insert 742 is used for mounting the omni-directional antennas under center wing 700. Copper ground planes 740 and 741 are soldered to threaded brass insert 742. Copper ground planes 740 and 741 are six inch diameter circles cut from 0.002 inch thick copper foil. Copper ground planes 740 and 741 provide for an improved signal to noise ratio. Kapton tape is used to ensure isolation from ground plane 740 and 741. Cable harness 746 is routed along a groove carved into the foam along the spar and epoxied in place, exiting into the payload cavity. Patch antennas 744 are located near the ends of center wing 700. The cables for patch antennas 744 are routed just behind the leading edge of center wing 700 to the payload bay.

Other exemplary embodiments of the wing utilize other types and sizes of antennas. In further embodiments of the present invention, microcontrollers are embedded into the center wing. In this embodiment, the center wing takes a compact form during takeoff. Once the UAV reaches a certain speed or altitude, the microcontroller is signaled and allows a payload to expand out of the wing. This signaling may be automatic, upon command by an operator of the UAV, etc. In some embodiments, an antenna is folded into the center wing during takeoff. Then, when the UAV has reached a certain speed or altitude, the antenna unfolds and begins transmitting. Alternatively, an antenna is deployed out of the back of the UAV. In other embodiments, the antennas string out from the wings after takeoff.

Figure 8:
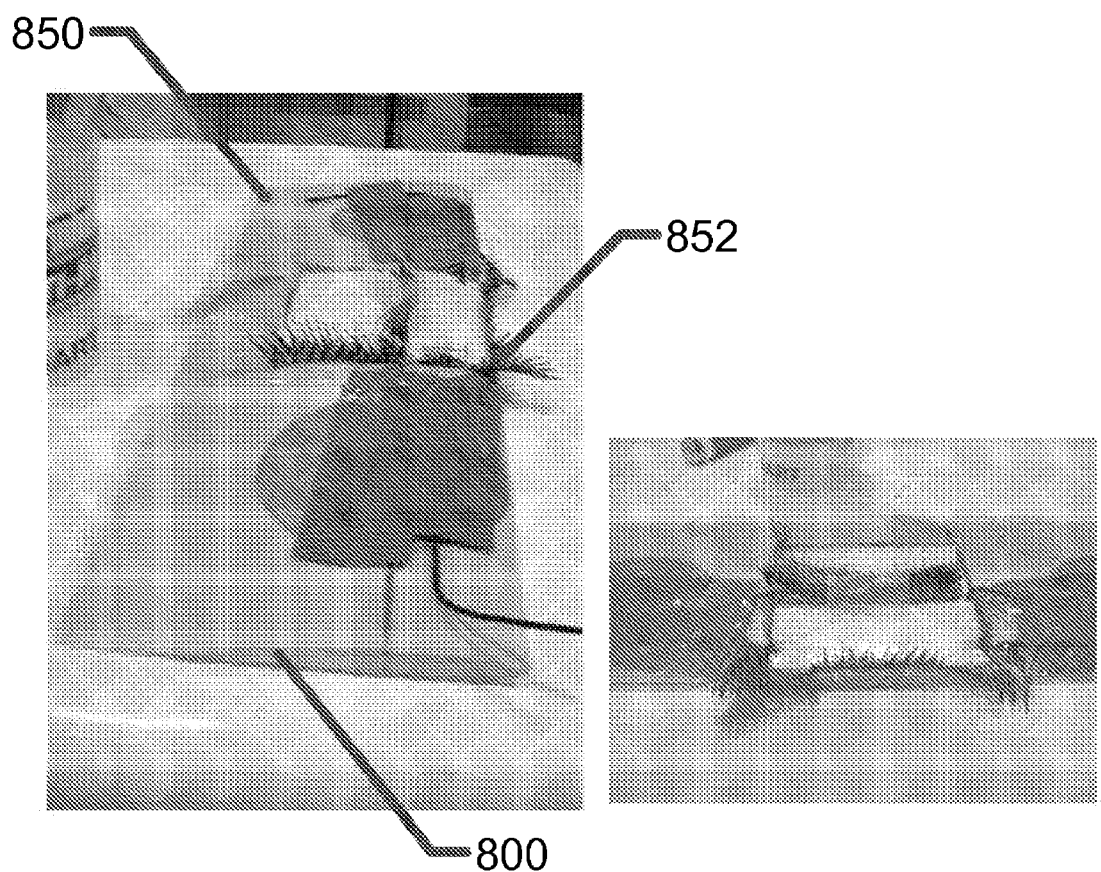
FIG. 8 shows a center wing having a fiberglass coating and a payload cavity lined with carbon-fiber/aromatic polyamide cloth, according to an exemplary embodiment of the present invention.

FIG. 8 shows a center wing 800 having a fiberglass coating and a payload cavity lined with carbon-fiber/aromatic polyamide cloth 852, according to an exemplary embodiment of the present invention. The payload cavity is lined with carbon fiber/aromatic polyamide cloth 852 to provide added strength and protection for the payload. This lining covers the bottom of the payload cavity opposite the side the canopy cover is attached to. Foam pieces may be inserted into the payload cavity to hold carbon fiber/aromatic polyamide cloth 852 in place.

Figure 9:
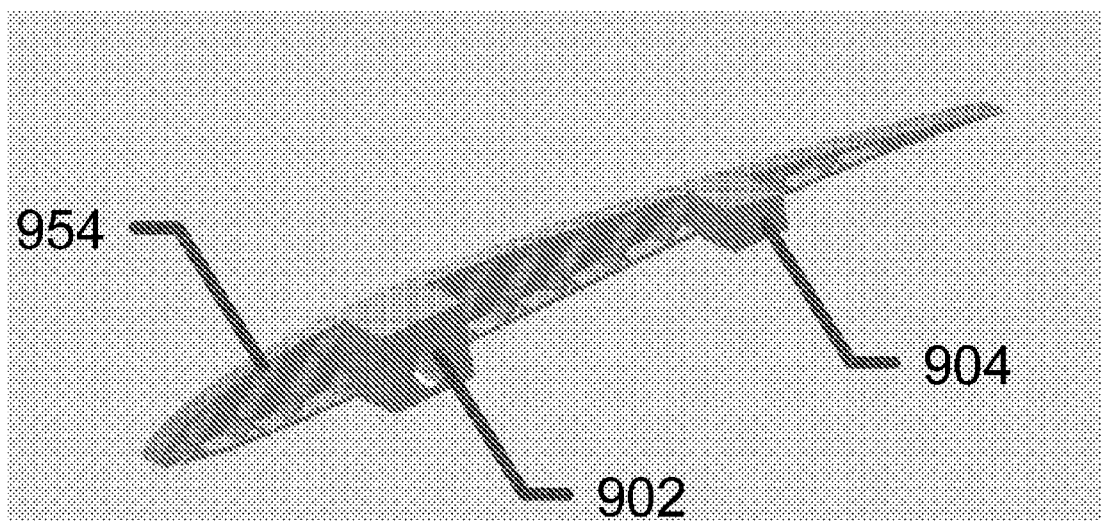
FIG. 9 shows an end plate for a center wing for an unmanned aerial vehicle, according to an exemplary embodiment of the present invention.

FIG. 9 shows an end plate 954 for a center wing for an unmanned aerial vehicle, according to an exemplary embodiment of the present invention. End plate 954 is printed using SLA (Stereo Lithography). End plate 954 is a full plastic part which couples to the ends of center wing as the edge piece on the wing. End plate 954 includes two slots built into it, a blind hole 902 and a shallow blind slot 904. Blind hole 902 and shallow blind slot 904 are sized appropriately for receiving dihedral wings to couple the dihedral wings to the center wing. End plate 954 adds rigidity to the center wing and protects the foam from damage. End plate 954 is glued onto the center wing using epoxy.

Alternatively, the end plate is cut from a sheet of 0.015" thick G10. G10 is an electrical alkali-free glass cloth that has been impregnated with an epoxy resin under pressure and heat. It possesses high mechanical properties at medium humidity and good dielectric stability at high humidity. It is easily machined, laser-cut, or water-jet cut. A custom fixture is used to ensure a blind hole is cut into the foam exactly normal to the nine degree surface of the end of the center wing. This fixture also ensures that a carbon fiber cylinder is glued into the hole properly. A shallow blind slot for an anti-rotational alignment peg is carved into the foam after the G10 end plates are glued onto the sides.

When the structure of the center wing has been created, the center wing is wrapped in a fiberglass cloth that is impregnated with epoxy resin. For example, three layers of wetted fiberglass cloth are laid over the wing before putting the wing under a vacuum for curing. The center wing is then sealed. For example, in an exemplary embodiment of the present invention, EZ-LAM LAMINATING EPOXY is used for this sealing of the wings. This type of epoxy is utilized, as it is for use with lightweight fiberglass, carbon fiber, and aromatic polyamide cloth. The low viscosity of the epoxy allows it to flow easily into the weave of the cloth. EZ-LAM cures to a hard, high strength gloss finish and sands easily.

Figure 10:
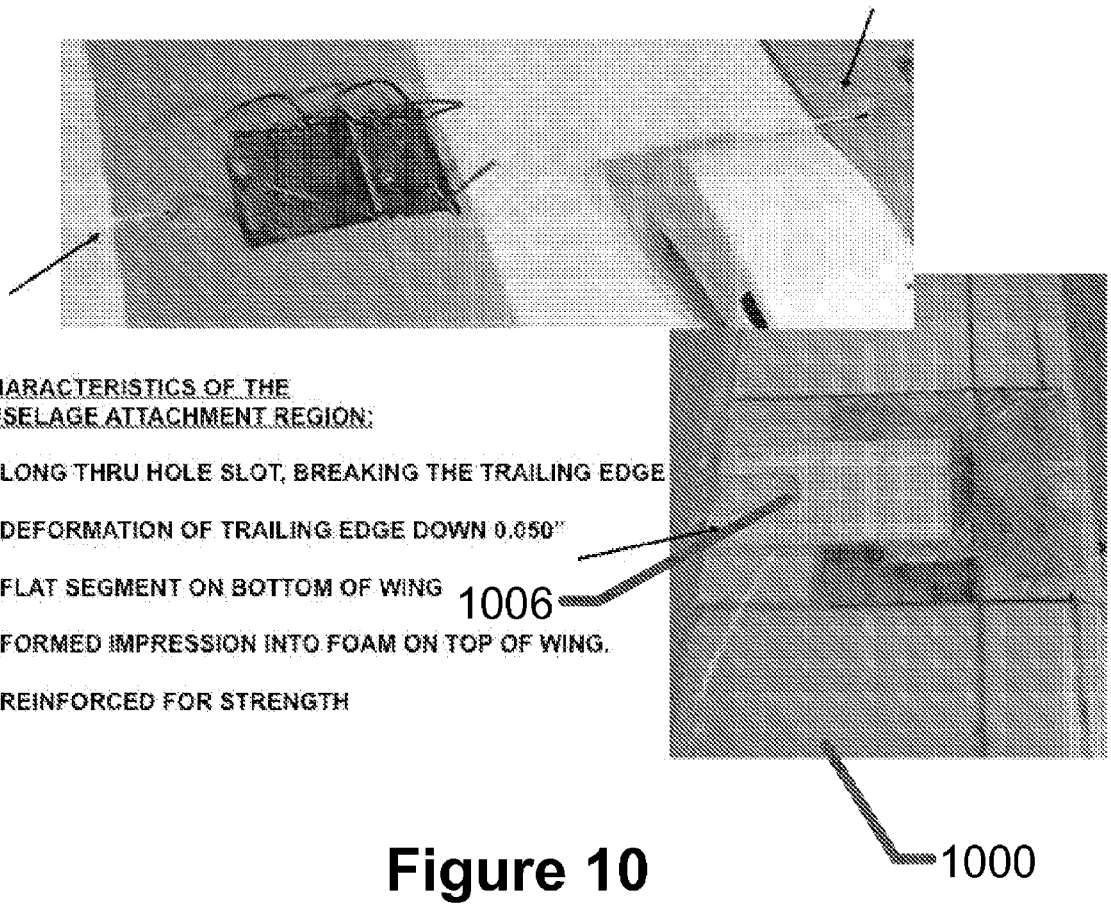
FIG. 10 shows the underside of a center wing for an unmanned aerial vehicle, according to an exemplary embodiment of the present invention.

FIG. 10 shows the underside of a center wing 1000 for an unmanned aerial vehicle, according to an exemplary embodiment of the present invention. The underside of center wing 1000 has a flat segment 1006. Flat segment 1006 is made from a stronger material than the foam which makes up the rest of the wing. Flat segment 1006 reinforces the floor of the payload canopy, and, according to one exemplary design, provides for a specific fitment to the RQ-11 UAV. The U-shaped cut-out of flat segment 1006 is removed so that the shape can be depressed into the foam of center wing 1000. The impression is also for specific mounting fitment of the RQ-11.

Various payloads may be utilized in conjunction with the payload canopy. The agnostic payload canopy may house, for example, battery payloads, explosive payloads, communications payloads, signals or electronic intelligence payloads, geolocation payloads, communications intercept payloads, jamming payloads, communications relay payloads, etc. Thus, the payload canopy is very versatile and increases the versatility of the UAV. For instance, a battery payload allows for longer flight time of the UAV, explosive payloads allow the UAV to be used as a weapon, etc. The payload canopy allows for the rapid evaluation of new small sensors by providing a very cheap test platform.

Figure 11:
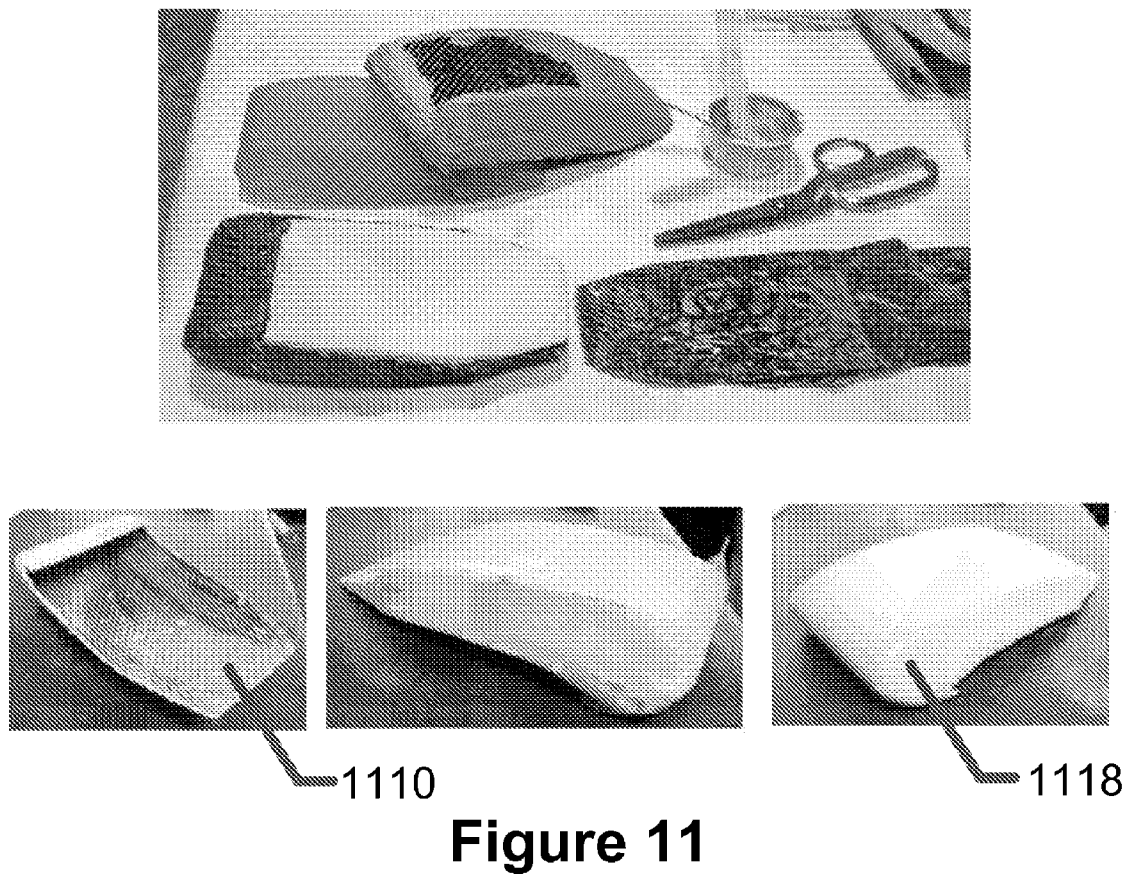
FIG. 11 shows a canopy for a center wing made from a mold, according to an exemplary embodiment of the present invention.

FIG. 11 shows a canopy 1110 for a center wing made from a mold 1118, according to an exemplary embodiment of the present invention. Mold 1118 is made from a rapid prototype model of canopy 1110. A carbon-fiber/aromatic polyamide lay-up is wrapped around mold 1118. Epoxy is then applied to the carbon-fiber/aromatic polyamide lay-up and it is held in position until hardened. An epoxy filler compound is used around the surface of canopy 1110 to fill in the cracks and round off the edges. The filler compound is then sanded away to smooth the surface.

The payload canopy allows for the integration of a single board computer onto a UAV and keeps it enclosed in a shelter, thus keeping it from easily being damaged. In embodiments of the present invention, the payload canopy is RF opaque so that there is no interference on the payload. Thus, the only things talking to the payload itself are coming through the antennas provided in the wing. An RF opaque payload canopy is not necessary, but is very useful with many types of payloads.

Embodiments of the present invention include a GPS antenna embedded in the center wing. This allows for a better signal to the GPS antenna. Further embodiments of the present invention include a GPS receiver mounted within the center wing. The mounting of the GPS receiver in the center wing allows for more room in the payload canopy for other payloads and also balances the weight of the wing and payload.

Figure 12:
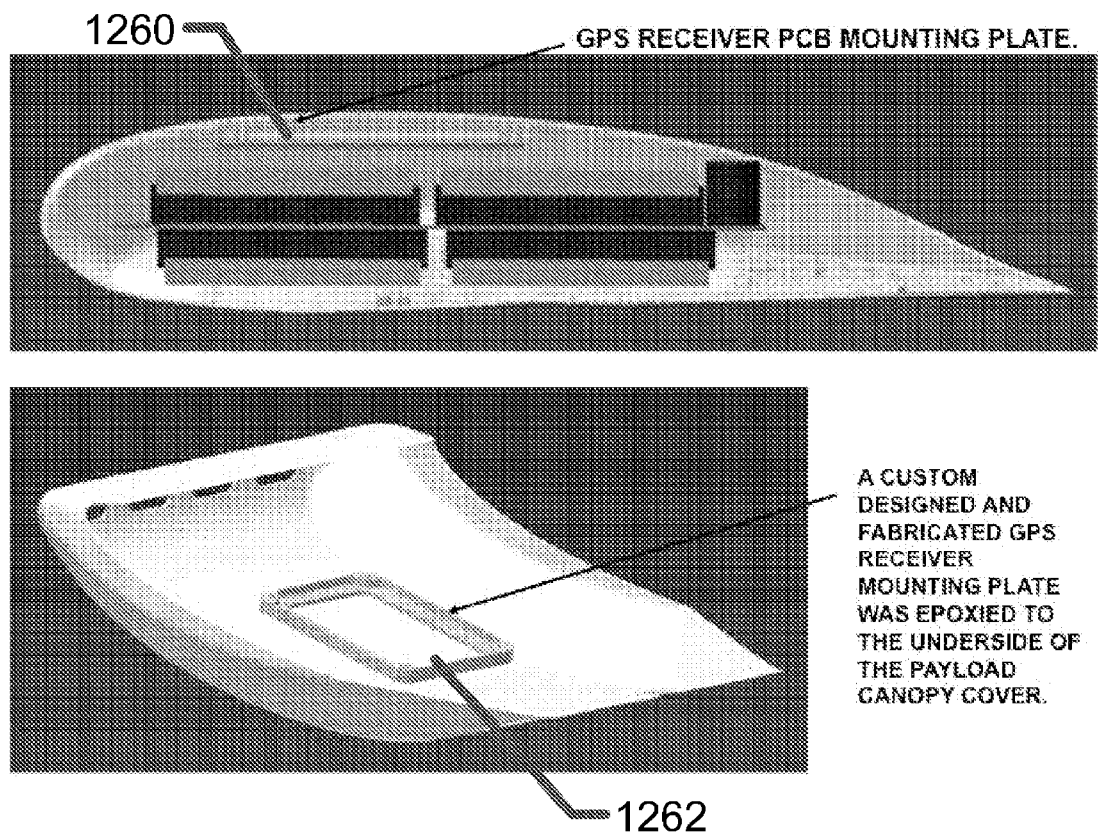
FIG. 12 shows a canopy for a center wing for an unmanned aerial vehicle, according to an exemplary embodiment of the present invention.

FIG. 12 shows a canopy for a center wing for an unmanned aerial vehicle, according to an exemplary embodiment of the present invention. The canopy includes a GPS receiver 1260 mounted to a mounting plate 1262. The canopy itself is made from a thin carbon-fiber material leaving the inside completely hollow. GPS receiver 1260 is very small, and can be attached within the canopy while leaving a substantial amount of the volume for other cargo. Mounting plate 1262 is attached to the upper wall or ceiling of the canopy so GPS receiver 1260, in most cases, does not touch any other cargo while the UAV is flown in an upright orientation.

Figure 13A:
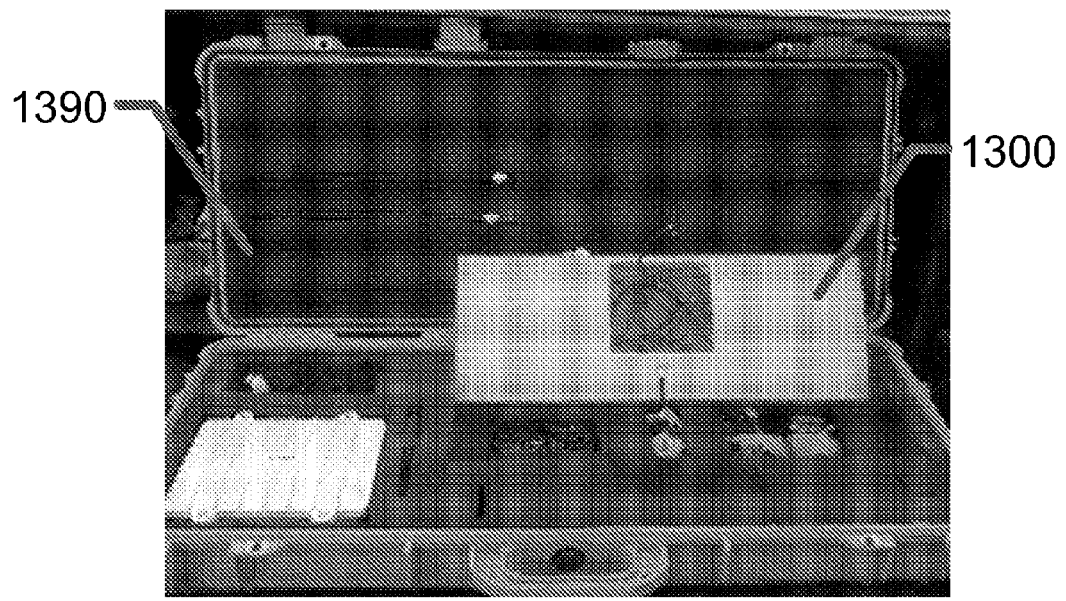
FIGS. 13A and 13B show a carrying case for a center wing for an unmanned aerial vehicle, according to an exemplary embodiment of the present invention.
Figure 13B:
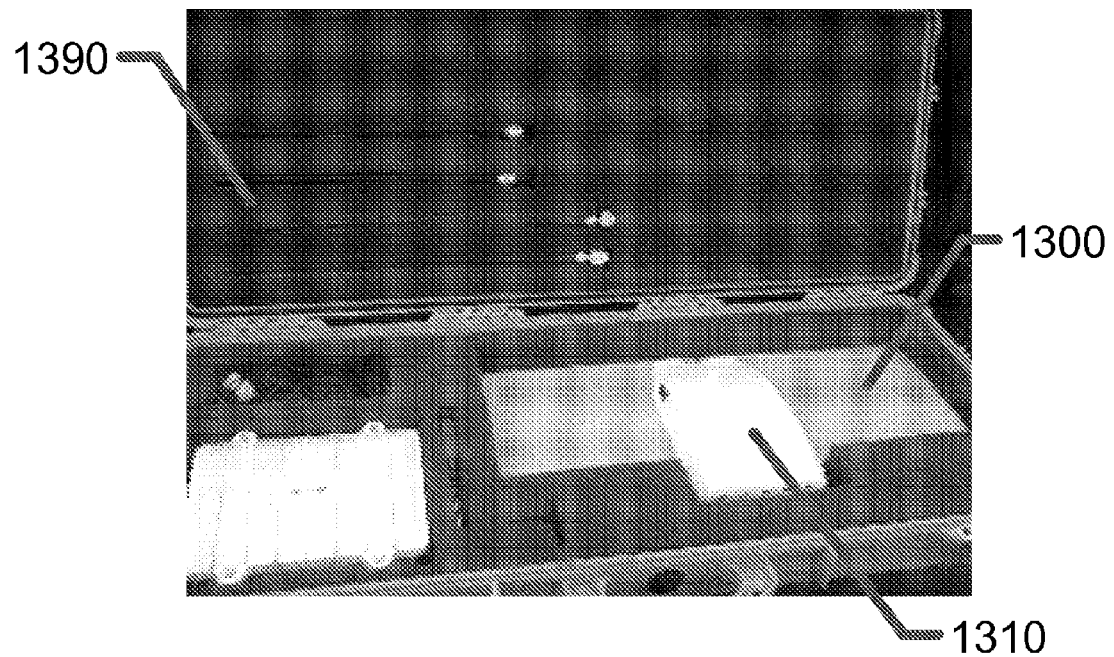

FIGS. 13A and 13B show a carrying case 1390 for a center wing 1300 for an unmanned aerial vehicle, according to an exemplary embodiment of the present invention. In this embodiment, carrying case 1390 provides a padded interior for storing or transporting center wing 1300. Carrying case 1390 provides contoured compartments for center wing 1300 and payload canopy 1310, as well as any payloads, antennas, tools, accessories, etc. These contoured compartments are preferably composed of foam or other material which holds objects in place while providing shock absorption properties. Carrying case 1390 preferably has a rigid shell such that it can adequately protect center wing 1300 and payload canopy 1310 when dropped, in transport, etc.

Figure 14:
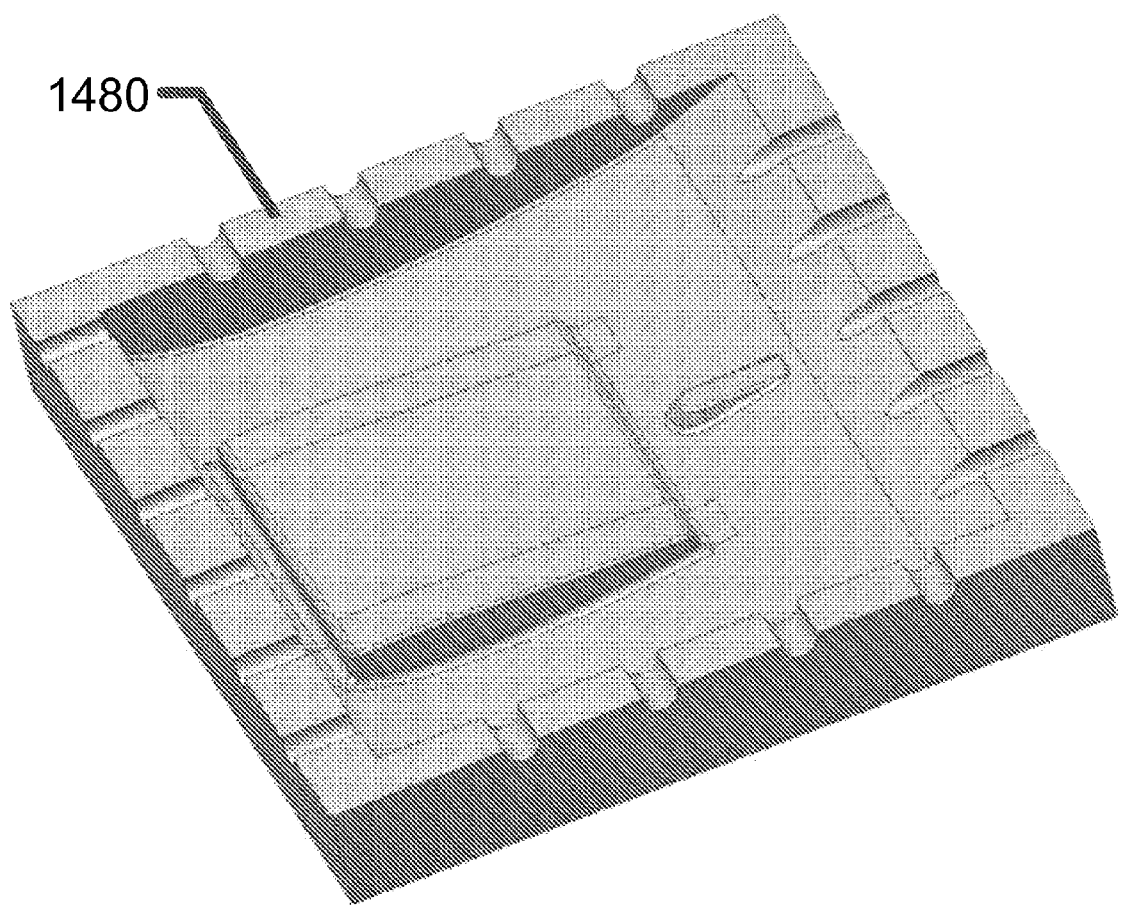
FIG. 14 shows a top-half mold for a center wing payload bay reinforcing sub-component for an unmanned aerial vehicle, according to an exemplary embodiment of the present invention.

FIG. 14 shows a top mold 1480 for a center wing payload bay reinforcing sub-component for an unmanned aerial vehicle, according to an exemplary embodiment of the present invention. Top mold 1480 is filled with a material such as epoxy, carbon fiber, etc., and then coupled to a bottom mold. Top mold 1480 and the bottom mold together hold the material in the shape of a payload bay until the material hardens. Excess material is allowed to escape through holes around top mold 1480. Top mold 1480 creates a mounting plate, mounting slot, etc. on the payload bay such that the payload bay may be inserted into a foam core of the center wing.

Figure 15:
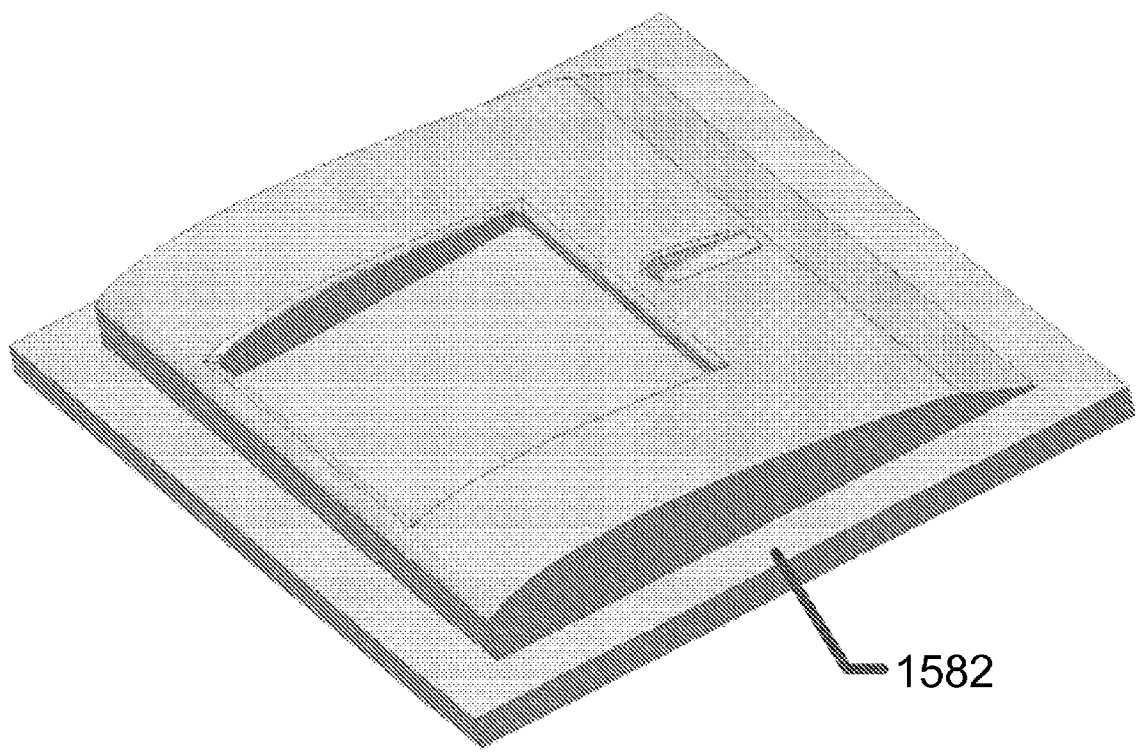
FIG. 15 shows a bottom-half mold for a center wing payload bay reinforcing sub-component for an unmanned aerial vehicle, according to an exemplary embodiment of the present invention.

FIG. 15 shows a bottom mold 1582 for a center wing payload bay reinforcing sub-component for an unmanned aerial vehicle, according to an exemplary embodiment of the present invention. Bottom mold 1582 is coupled to a top mold, seen in FIG. 14, containing a material. Together, the top mold and bottom mold 1582 hold the material in a shape such that the material hardens and can be taken out of the mold. The top mold and bottom mold 1582 together form a payload bay to be inserted into a foam core of the center wing.

Figure 16:
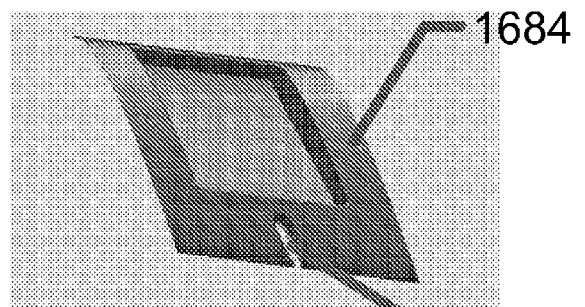
FIG. 16 shows a center wing payload bay reinforcing sub-component for an unmanned aerial vehicle, according to an exemplary embodiment of the present invention.

FIG. 16 shows a center wing payload bay 1684 reinforcing sub-component of a center wing for an unmanned aerial vehicle, according to an exemplary embodiment of the present invention. In this embodiment, payload bay 1684 is created from a mold. Payload bay 1684 is a carbon fiber bay that is inserted into a foam core of the center wing. Payload bay 1684 provides a strong, rigid structure that strengthens the overall center wing while providing protection for a payload. Payload bay 1684 includes a mounting slot 1616 for mounting a payload canopy.

In alternate embodiments the payload bay is made from light metals, strong thermoplastics, etc. Carbon fiber makes a lightweight and strong payload bay making it versatile among payload types and weights. A strong thermoplastic may be suitable for lighter payloads while a light metal, such as titanium and its alloys, may be suitable for heavier payloads or larger UAVs.

Figure 17:
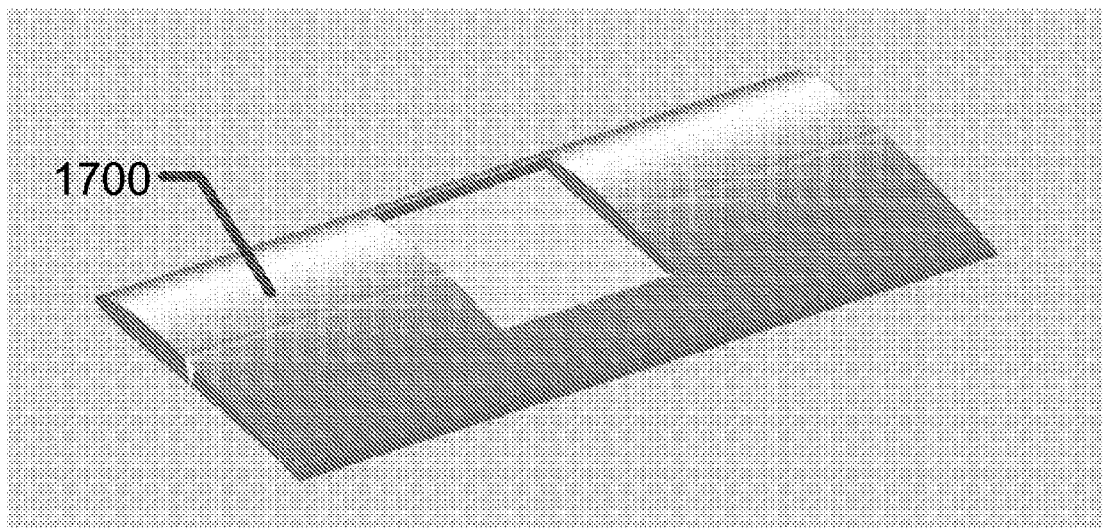
FIG. 17 shows a center wing core for an unmanned aerial vehicle, according to an exemplary embodiment of the present invention.

FIG. 17 shows a center wing core 1700 for an unmanned aerial vehicle, according to an exemplary embodiment of the present invention. In this embodiment, center wing 1700 is composed of a solid foam core. The foam is strong enough that an internal structure is not necessary. A fiberglass coating is applied to the foam core to add strength and rigidity.

The solid center wing is lighter than its framed counterpart, which allows for heavier payloads or longer flight times. This also decreases the manufacturing time and cost for the center wing.

Exemplary embodiments of the present invention utilize carbon fiber and aromatic polyamide cloth in the construction of the payload canopy. The payload canopy mimics the aerodynamic shape of the wing as much as possible to reduce interference. Because of where the propeller is mounted on a UAV such as the RAVEN, the payload canopy allows airflow to still get to the propeller so that a significant amount of lift is not lost. Embodiments of the present invention also include optional air vents into the payload canopy for cooling purposes of the payload equipment. The carbon fiber vented enclosure maximizes the RF shielding to prevent interference from payloads from affecting aircraft systems such as GPS, and has better cooling capabilities and weight distribution than the prior art. Due to the easy production requirements of the payload canopy, multiple sizes or materials for the enclosure may be used in order to optimize the payload size and the radio frequency transparency for special applications.

The payload canopy and center wing subcomponent remain independent from the rest of the UAV. This allows the invention to easily be attached and removed from the UAV. The invention includes its own communication downlinks, allowing existing communications downlink antennas on the UAV to remain for their intended purposes such that all features of the UAV remain.

In exemplary embodiments of the present invention, the payload canopy is designed to house certain payloads. For example, brackets for mounting payloads may be included on the interior of the payload canopy. Alternatively, a generic bracket may be used such that many different payloads may be attached. Velcro straps have been used on an existing embodiment.

When used in conjunction with a RQ-11 RAVEN, the invention (including batteries) only added a minimal amount of weight, roughly 6 ounces, to the overall RAVEN. The invention, however, allows a user to add a payload roughly 25-30% of the weight of the RAVEN with little noticed degradation in flight. Thus, a small UAV platform in conjunction with the present invention provides a relatively cheap test platform that allows for rapid evaluation of new small sensors.

When testing a RQ-11 RAVEN with the present invention, a payload attached using the present invention did not noticeably affect the RAVEN's flight. When using a one-pound payload the RAVEN did not show any qualitative changes in flight. There was no noticeable porpoising in the flight dynamics. The RAVEN, with payload, took off well and landed similarly to a RAVEN without a payload.

The pieces integral to the core functionality of a UAV vary from one UAV to another. While one UAV may contain a component in one place, that location may be empty in another UAV. In embodiments of the present invention, removable portions of a UAV, other than the center wing, are used to house a payload. A canopy is designed to fit these portions while retaining the general aerodynamic shape of the UAV.

In a further embodiment of the present invention, a payload canopy is simply clipped onto an existing wing. The wing is no longer replaced, as the payload canopy "piggybacks" on the wing. In this embodiment, the payload canopy is a rigid aerodynamic structure that is easy to attach with a clip or fastener. This embodiment is quickly removable from the UAV. However, the center wing portion does not have its own cavity in these embodiments. A canopy of the same size as with wing cavities results in a slight decrease in payload cavity volume. The clip-on canopy size can be increased to make-up for this, but the increased thickness in the resultant airfoil can decrease power and fuel efficiency.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device for use on a small unmanned aerial vehicle (UAV), the device comprising:
    a wing with a center wing portion extending over the UAV, the wing having an open cavity and a wing airfoil; and
    a cover removably coupled to the open cavity having an aerodynamic shape such that the combination of the cover and the wing yields a payload airfoil of greater thickness than the wing airfoil;
    wherein a payload cavity is created from the combination of the volume of the open cavity and from the volume added by the cover.

2. The device of claim 1, wherein the cover further comprises an air intake at the leading edge of the airfoil and an exhaust near the trailing edge of the airfoil.

3. The device of claim 1, wherein the center wing portion further comprises an internal structure.

4. The device of claim 3, wherein the internal structure is used for reinforcing the payload cavity.

5. The device of claim 1, wherein the center wing portion comprises a solid foam core.

6. The device of claim 1, wherein the center wing portion is removably coupled to the body of the UAV.

7. The device in claim 1, wherein the center wing portion further comprises an integrated internal antenna cavity.

8. The device in claim 7, wherein a cable harness electrically links an antenna in the integrated internal antenna cavity to a payload inside the payload cavity.

9. The device in claim 8, wherein the antenna includes a copper ground plane.

10. The device of claim 1, wherein the cover contains an integrated GPS receiver, which is located near the top of the canopy airfoil.

11. A payload cavity for use on an unmanned aerial vehicle (UAV), the payload cavity comprising:
    a wing with a center wing portion extending over the UAV, the wing having an open cavity centered along the UAV's line of symmetry and a wing airfoil; and
    a rigid cover providing an open volume removably coupled to the open cavity such that the open volume and the open cavity are united;
    wherein the union of the open volume and the open cavity creates a payload volume and a payload airfoil.

12. The payload cavity of claim 11, wherein the rigid cover further comprises an air intake at the leading edge of the payload airfoil and an exhaust near the trailing edge of the payload airfoil.

13. The payload cavity of claim 11, wherein the center wing portion further comprises an internal structure.

14. The payload cavity of claim 11, wherein the center wing portion comprises a solid foam core.

15. The payload cavity in claim 11, wherein the center wing portion further comprises an integrated internal antenna cavity.

16. The payload cavity in claim 15, wherein a cable harness electrically links an antenna in the integrated internal antenna cavity to a payload inside the open cavity.

17. The payload cavity in claim 16, wherein the antenna includes a copper ground plane.

18. The payload cavity of claim 11, wherein the rigid cover contains an integrated GPS receiver.

* * * * *